United States Patent [19]

Tiegel et al.

[11] Patent Number: 5,992,477
[45] Date of Patent: Nov. 30, 1999

[54] BATTERY ACID FILLER MACHINE AND METHOD

[75] Inventors: Ralph G. Tiegel, Redwood City; Wade F. Galloway, Union City, both of Calif.

[73] Assignee: Tiegel Manufacturing Co., Belmont, Calif.

[21] Appl. No.: 09/107,548

[22] Filed: Jun. 30, 1998

Related U.S. Application Data

[60] Provisional application No. 60/052,928, Jul. 5, 1997.

[51] Int. Cl.$^6$ ....................................................... B65B 1/30
[52] U.S. Cl. .......................... 141/192; 141/127; 141/236
[58] Field of Search ............................... 141/192, 32, 59, 141/126, 127, 121, 123, 236, 237, 242, 198, 283; 29/729; 222/67

[56] References Cited

U.S. PATENT DOCUMENTS

| | | | |
|---|---|---|---|
| 3,880,209 | 4/1975 | Haughn et al. | 141/95 |
| 3,911,972 | 10/1975 | Hubers et al. | 141/7 |
| 3,934,624 | 1/1976 | Eberle | 141/100 |
| 4,289,176 | 9/1981 | Evans | 141/35 |
| 5,731,099 | 3/1998 | Badger et al. | 429/72 |

*Primary Examiner*—J. Casimer Jacyna
*Assistant Examiner*—Peter deVore
*Attorney, Agent, or Firm*—Frank J. Benasutti

[57] ABSTRACT

A battery acid filler apparatus and method are disclosed. The apparatus and method utilize a single, relatively large diameter tube to both fill and retract excess acid from a battery, at a single station by means of controlling the time of filling and the opposing pressures of acid pumps.

8 Claims, 8 Drawing Sheets

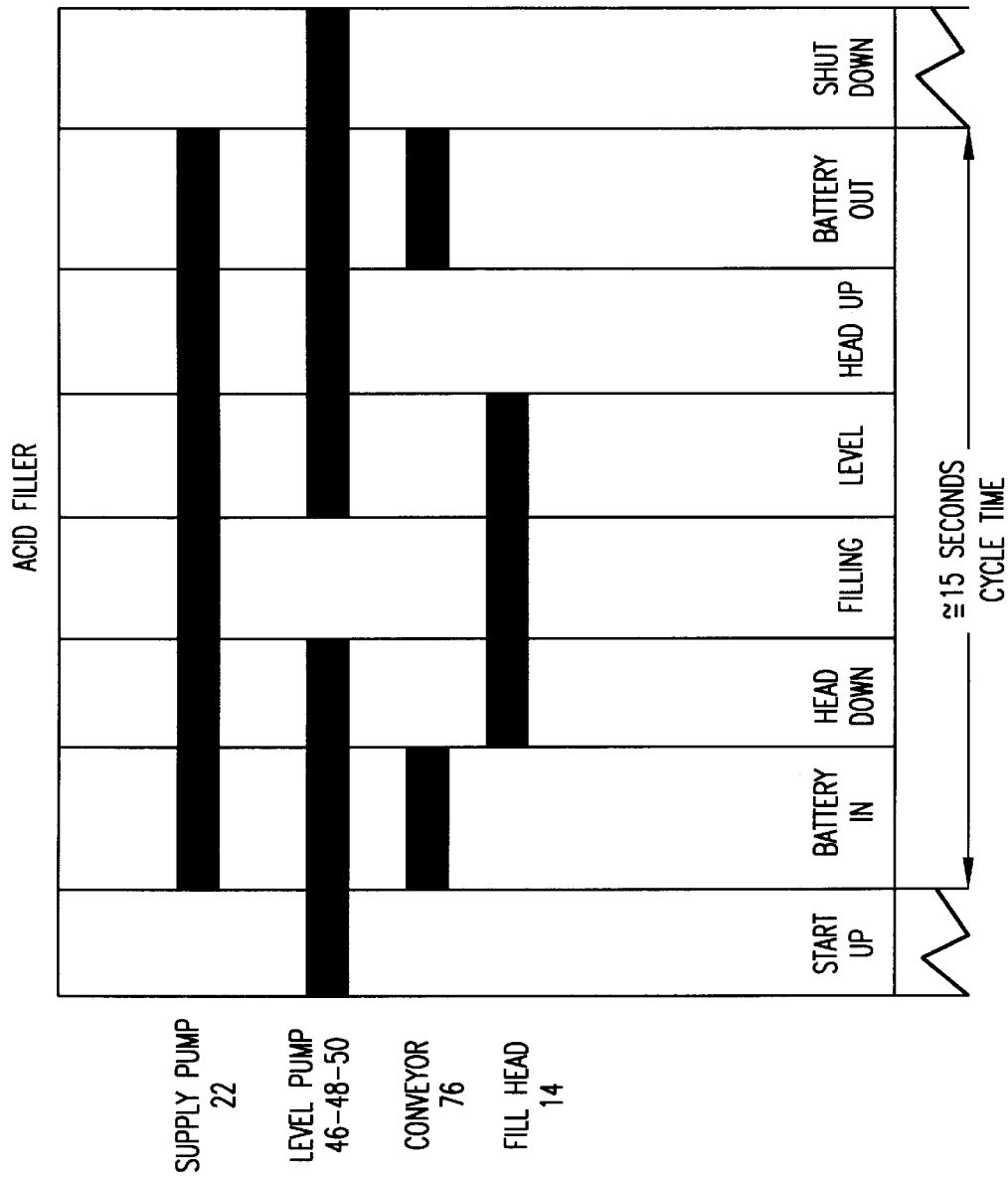

BATTERY ACID FILLER MACHINE AND METHOD

CROSS REFERENCE TO RELATED APPLICATION

This application is a continuation-in-part of our prior co-pending provisional patent application Ser. No. 60/052,928, filed Jul. 5, 1997; the disclosure of which is incorporated herein by reference as if fully set forth.

BACKGROUND ART

1. Field of Invention

This invention relates to automatic machines and processes for filling batteries with acid.

2. Prior Art

In the prior art, it is known to assemble automotive batteries completely with the plates and separators assembled in cells and the lids of the batteries sealed to the cases of the batteries. The covers of the batteries have holes for venting gases from the batteries as well as for pouring acid into the batteries in order to cover the plates. The assembled batteries are passed under acid filling machines in order to fill them with acid before the vent caps are placed over the vent/acid fill holes.

In the prior art, it was known to place two concentric tubes into each battery vent. This thereby reduced the fill diameter to the point where the actual filling of the battery was quite slow.

Another method was to have a two-station operation wherein at one station acid would enter the battery by gravity and at the second station excess acid would be sucked out until the acid was at a proper level. In such a method, it was common to have battery acid overflows; with their attendant ecological problems.

Further, in the past, a vacuum system would implode the end cells of the battery which would result in a lower acid level on the end cells of the battery.

It is the desire of the present invention to eliminate the prior art problems regarding filling batteries.

SUMMARY OF THE INVENTION

Our battery acid filler apparatus comprises a supply pump means for supplying acid under a first head to a battery; said battery having a plurality of filler ports; connecting tube means are provided comprising a plurality of tubes each connected at one end with said supply pump means and in fluid flow communication therewith for receiving acid therefrom; level pump means are provided comprising a plurality of level pumps in fluid flow communication from each of their discharge ends to the other ends of each connecting tube; said level pump means being capable of producing a second head higher than said first head produced by supply pump means; filler head means are provided comprising a plurality of filler head tubes each connected to the other end of a different level pump and in fluid flow communication therewith; each of these filler head tubes terminates in a filler spout at the end remote from the end connected to the level pump; each of said filler spouts being dimensioned to fit inside a filler port, with a slight clearance therebetween to allow for passage of air; sequencing means are connected to said filler head means to move said filler spouts into said filler ports and thereafter to retract said spouts from said ports; said sequencing means controls the flow of acid into said battery in accordance with a preset time interval, such that the battery will be over filled to the point where the acid will rise into the filler port, but not over the top of the port; and once the time interval runs out, the sequencing means turns the level pump means "on" so that acid is extracted from the filler ports down to the terminal ends of the filler spouts.

The sequencing means controls the supply pump means and the level pump means such that the level pumps are turned "on" before the supply pump means is turned "on". Once the filler spouts are inserted into the filler ports, the level pumps are turned "off" thereby permitting acid to flow into the battery from the supply means.

In accordance with the method of our invention, filling a battery with acid comprises the steps of: introducing acid into the filler ports of the battery at a first predetermined pressure for a predetermined time interval to the point where the acid rises into the ports, but not over the top of the ports; and then extracting acid from the ports down to a predetermined level.

Thus we use a pump to act as a valve to stop liquid flow. This is accomplished by having the pressure of the pump higher than the liquid supply pressure.

Further, the pump is used to level an overfilled container. This is accomplished, in part, by inserting the conduit to the intake of the pump into the container to the desired level. Multiple pumps can be used to level multiple cells of a battery, simultaneously.

BRIEF DESCRIPTION OF THE DRAWINGS

FIG. 8 is a bar chart showing the sequencing of the apparatus and method of this invention.

DESCRIPTION OF THE PREFERRED EMBODIMENT

Figure 1:
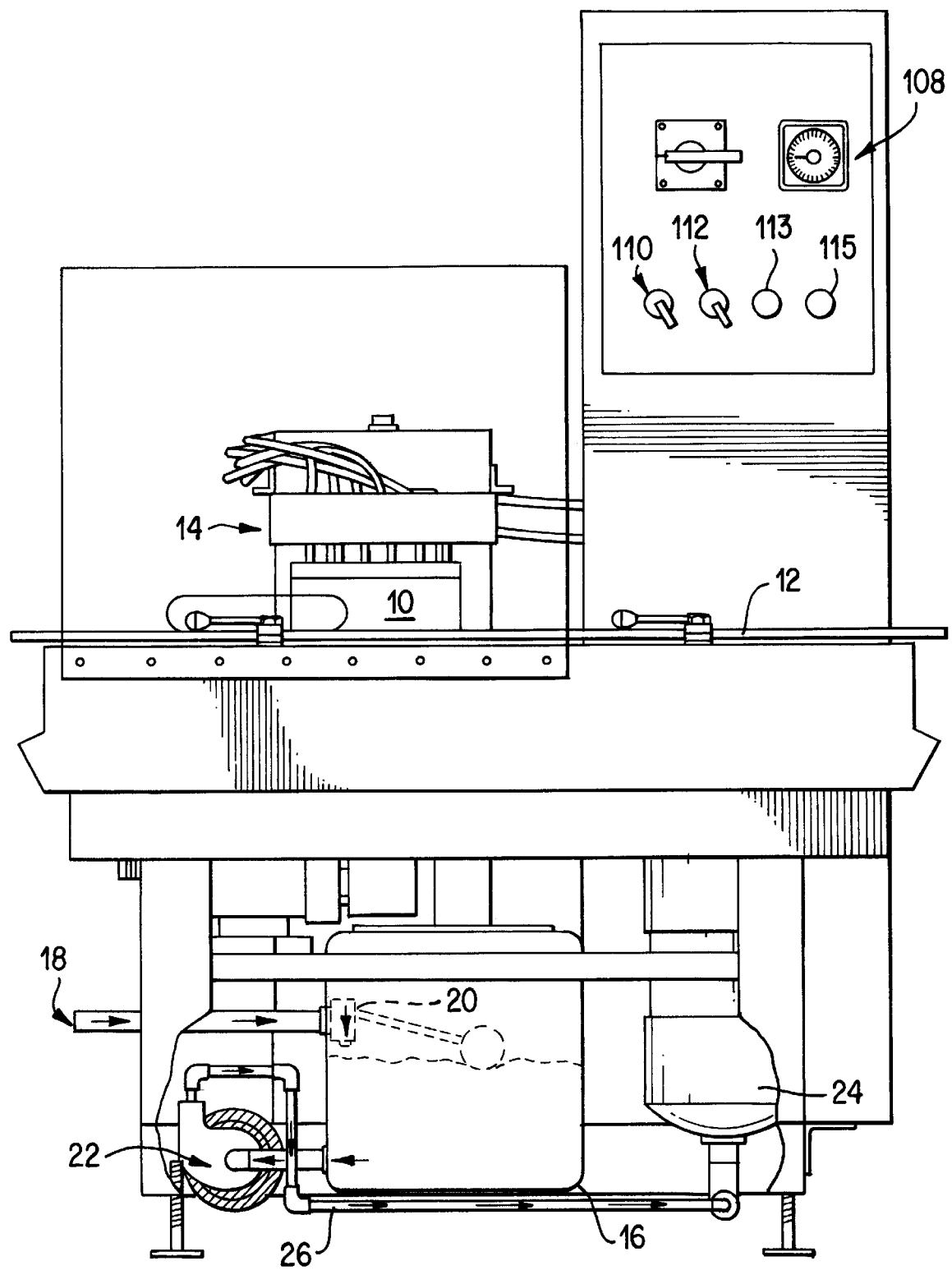
FIG. 1 is a front elevation of an apparatus in accordance with the preferred embodiment of the invention.
Figure 2:
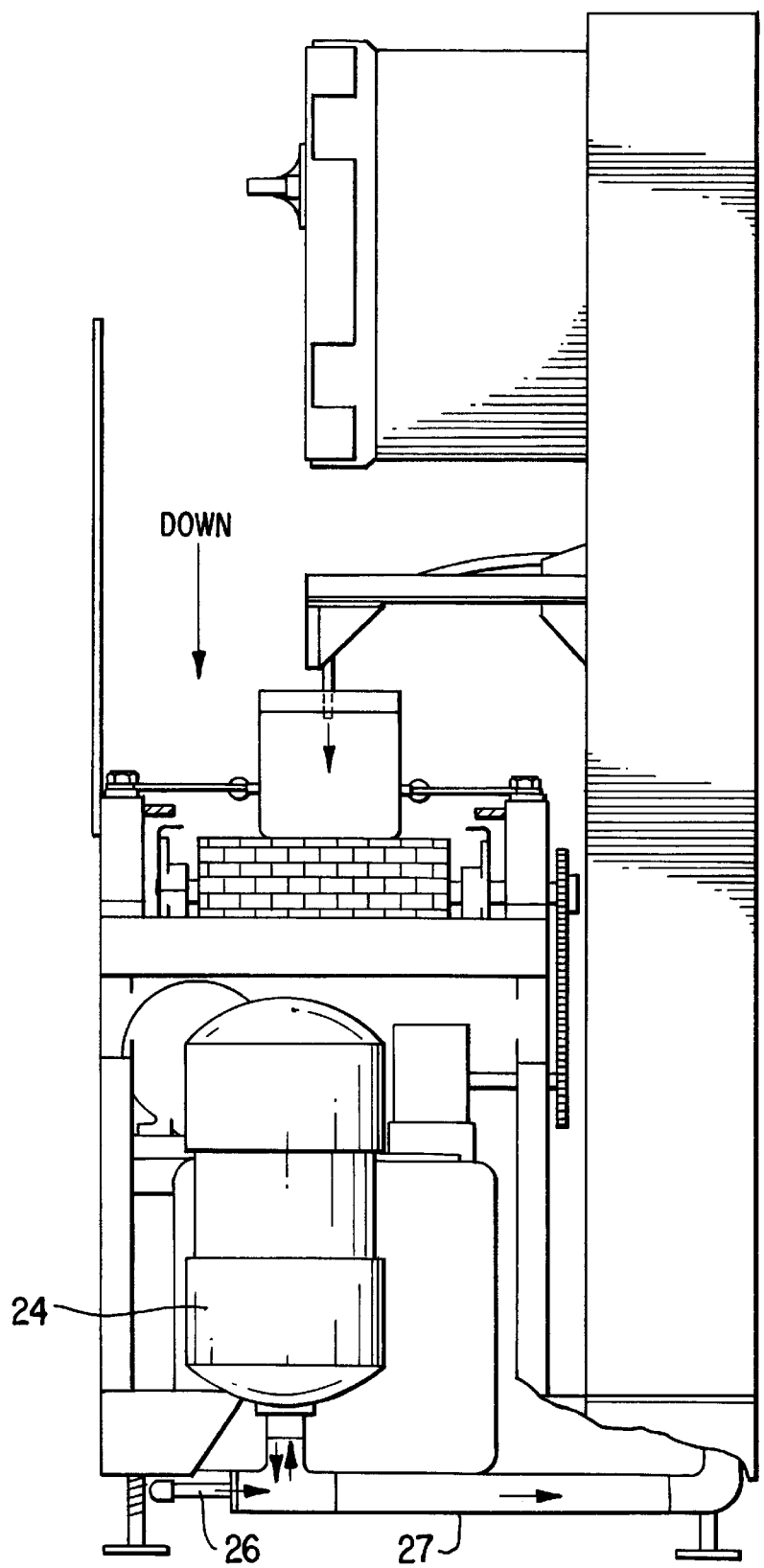
FIG. 2 is a right side view of the apparatus shown in FIG. 1.
Figure 3:
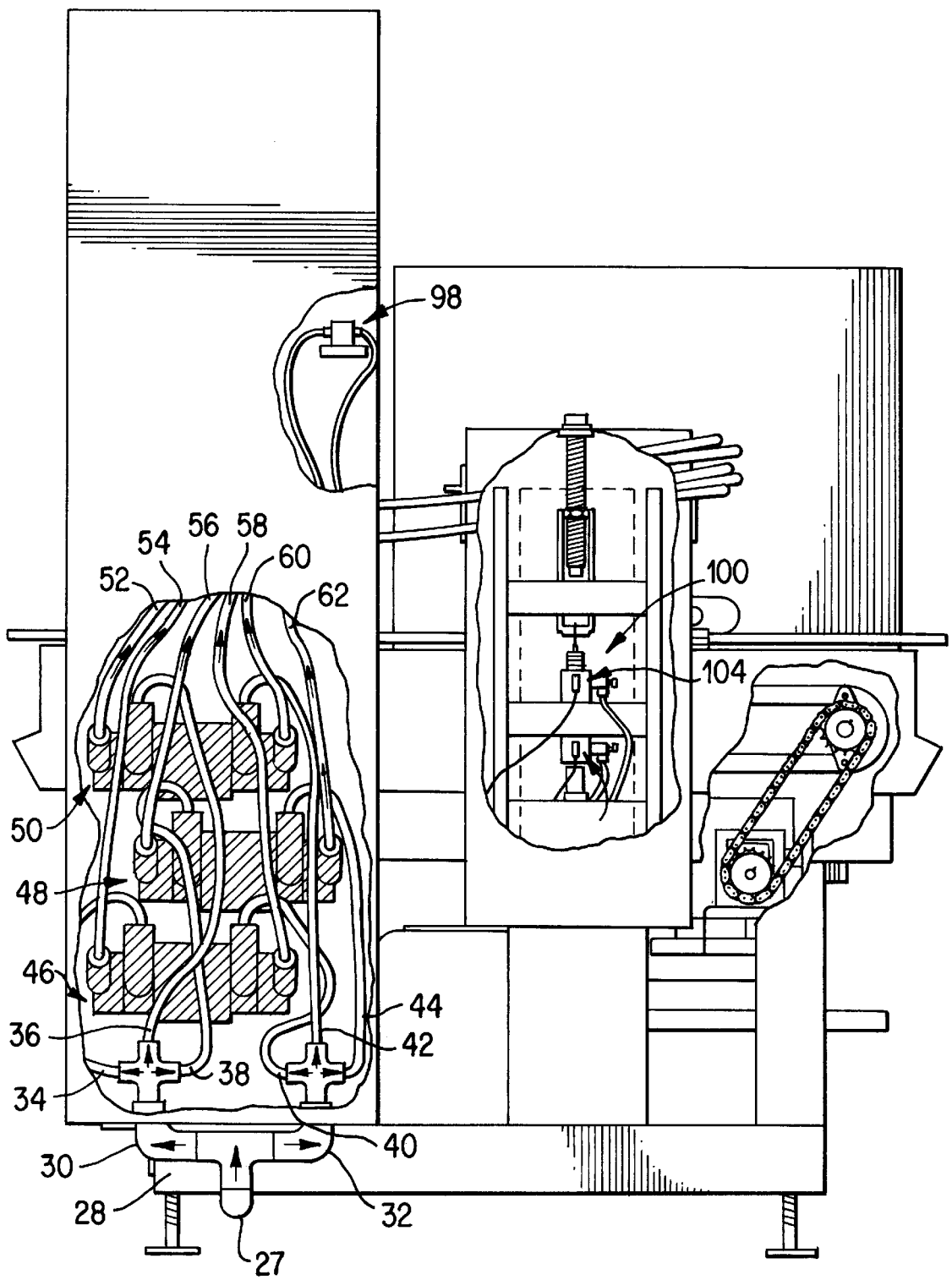
FIG. 3 is a back view of the apparatus shown in FIG. 1.

Referring to FIG. 1, a battery acid filler apparatus in accordance with the preferred embodiment of our invention is shown. An assembled battery 10 on assembly line 12 is shown in position in an acid fill station designated generally 14. A supply pump means is provided whereby acid is pumped into an on-board reservoir 16 from bulk storage (not shown) through conduit 18. Flow to on-board reservoir 16 is controlled by an internal float valve 20. Once the reservoir reaches a sufficient operating level, the float valve cuts off flow to reservoir. When the acid level drops from usage, the float valve opens and acid fills the reservoir to operating level. The supply pump means also includes a chemical pump 22 which pumps acid from the reservoir 16 to a pressure surge chamber 24 through conduit 26 and partially fills the chamber 24. Unabated, acid flows from the pressure surge chamber 24 through a conduit 27, FIG. 2 and a manifold designated generally 28, FIG. 3 that splits the flow in two in elbows 30 and 32 and then into six equal connecting tubes or lines 34, 36, 38, 40, 42, and 44. Each of these lines connect to a separate discharge of one of the six discharge ends of the three "dual" head chemical pumps designated generally 46, 48 and 50. From the other ends of the dual head pumps, six filler head tubes or lines 52, 54, 56, 58, 60 and 62 are provided to continue the flow of acid up to six filler spouts 64, 66, 68, 70, 72 and 74, FIG. 5, and thence into the battery fill/vent holes.

The dual head chemical pumps, when activated, have a higher static pressure head, which opposes the lower head of the supply pump that is pumping acid to the pressure surge chamber 24. This stops the filling and sucks the surplus acid out of the battery, down to same depth the filling nozzles are inserted into the cells (this is adjustable). Once the nozzle sucks air in, this stops the removal of acid. Acid that remains in the line is drawn back to the dual head pumps. Since the dual head pumps are self-priming, they continue to develop a counter-balancing pressure to oppose the filling pressure.

Figure 4:
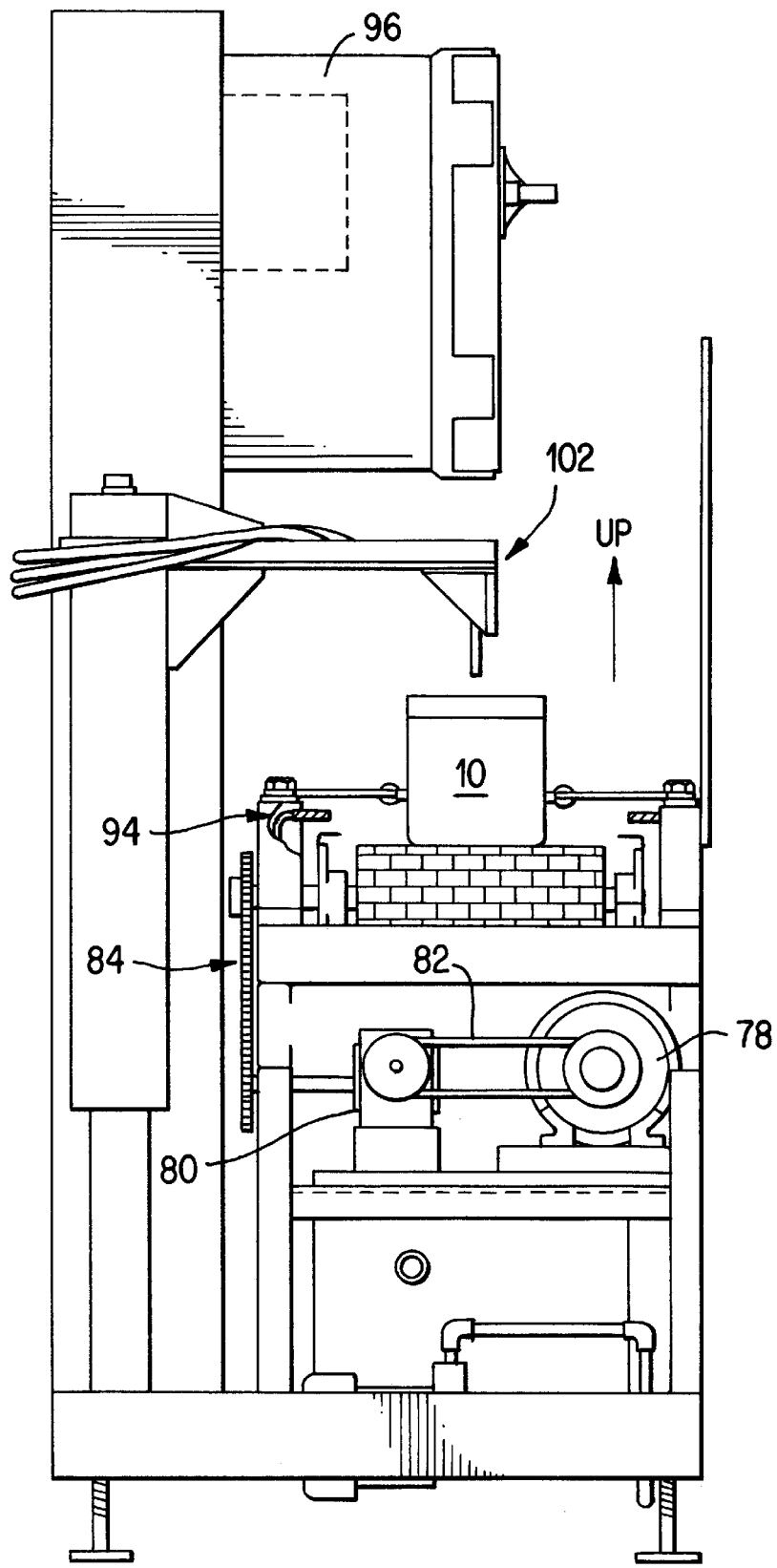
FIG. 4 is a left side view of the apparatus shown in FIG. 1.
Figure 5:
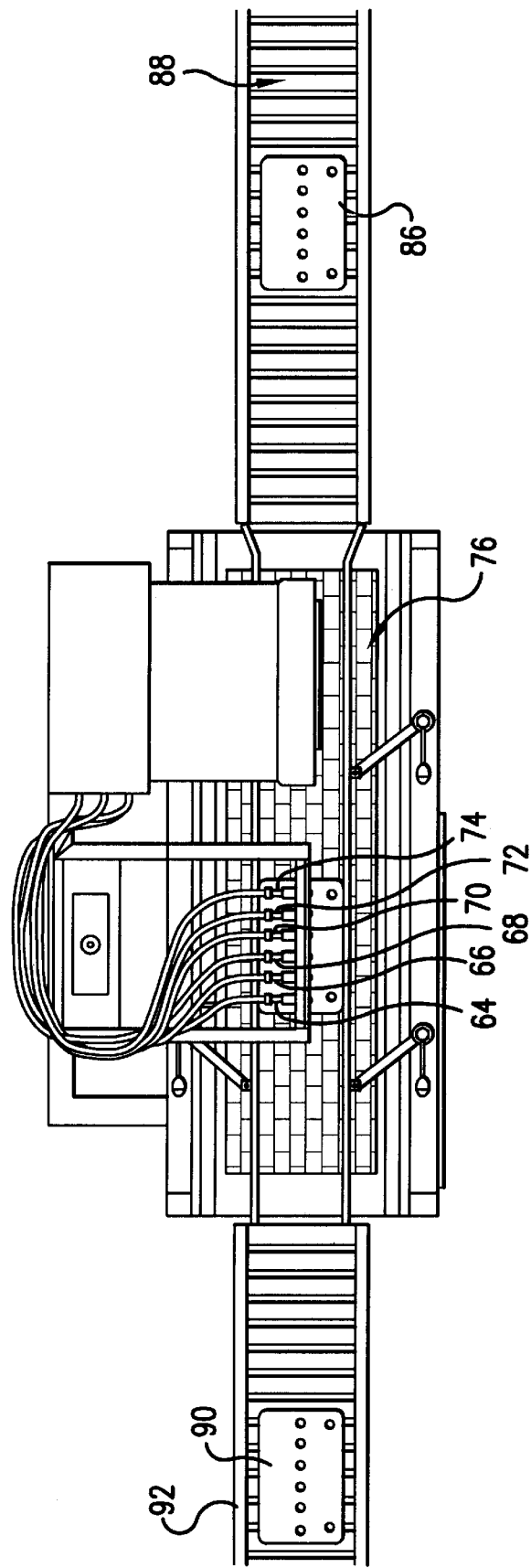
FIG. 5 is a top view of the apparatus shown in FIG. 1.

The conveyor, designated generally 76, FIG. 5 in the apparatus is driven by an electric motor 78, FIG. 4 with a bult-in electric brake. This motor drives a 50 to 1 reducer gear box 80 by fan belt 82, which, in turn, drives the conveyor by sprocket and chain mechanism designated generally 84.

The sequencing means

The conveyor is "normally on."

The machine is fed empty batteries 86, FIG. 5 one at a time, from the assembly line conveyor designated generally 88. Filled batteries 90 exit the machine via an exit conveyor 92.

When the battery 10 reaches approximately mid-way through the apparatus, the battery 10 trips an electronic eye, designated generally 94. When tripped, a programmed logic controller (PLC) designated generally 96, takes over operation of the apparatus. An adjustable time delay positions the battery under the fill head.

The PLC "sensing" the battery, stops the battery 10 in the "fill" position shown and sends a signal to an electrically operated air valve 98 that operates an air cylinder, designated generally 100, which moves the filler spout head designated generally 102 up and down. The air cylinder also has reed switches 104, 106 at each end, so the PLC can also sense whether the head is up, as shown in the alternate position in FIG. 4, or down, as shown in FIG. 1.

Figure 7:
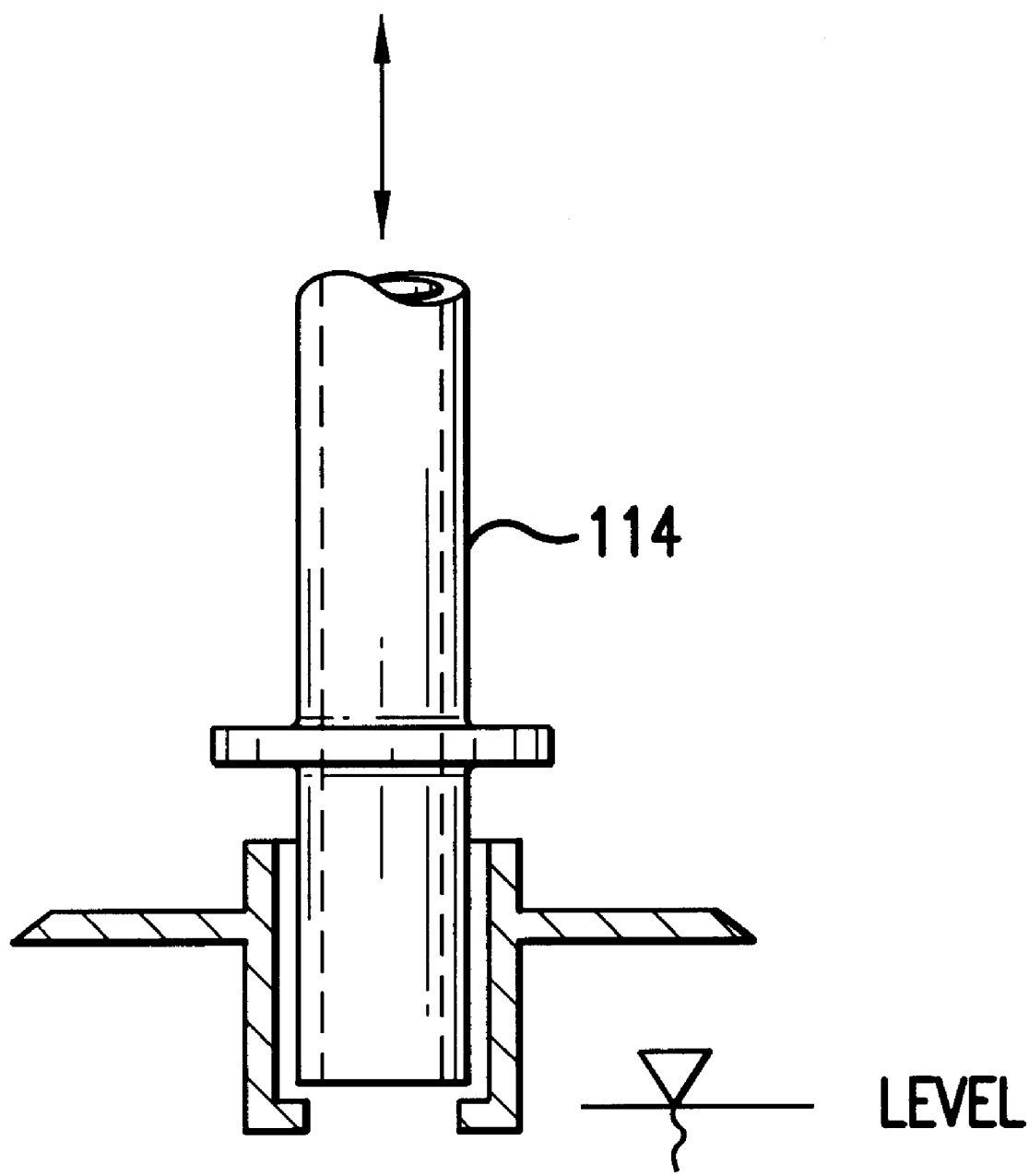
FIG. 7 is a detail of a portion of the apparatus.

When the filler head is moved down, each of the tubes 114 is inserted into a certain depth within the battery as shown more particularly in FIG. 7. Each filler spout comprises an acid fill tube 114 FIG. 7 of relatively large diameter; being dimensioned to be only slightly smaller in diameter that the fill/vent hole. The small clearance space therebetween allows air to pass (the significance of which will be described hereinafter). The PLC senses from the other reed switch that the filler head is down and turns off the "normally on" dual head level pumps.

Supply pump 22 pumps acid through the supply conduits and tubes 52 through 62, level pumps, filler head tubes and spouts into the battery. The adjustable timer 108 also starts when the head comes down. This timer is adjusted to just overfill a particular size of battery. This fill pump is timed to deliver acid over a specific interval of time, so as not to overflow the battery; but rather over fill the battery beyond the bottom of the fill/vent holes, but not over their tops.

When the timer runs out, the PLC turns back "on" the dual head level pumps. Acid flow is drawn back to the dual head level pumps. This provides enough suction to draw out the acid and thus to level off the acid only to the bottom of the fill spout, thereby evening out the level of acid in the individual cells of the battery.

The PLC then raises the filler head and turns the conveyor back on. The battery then exits on the exit conveyor 92 and another enters from the assembly line conveyor 88.

The process then repeats. The bar chart FIG. 8 shows the sequence timing.

Figure 6:
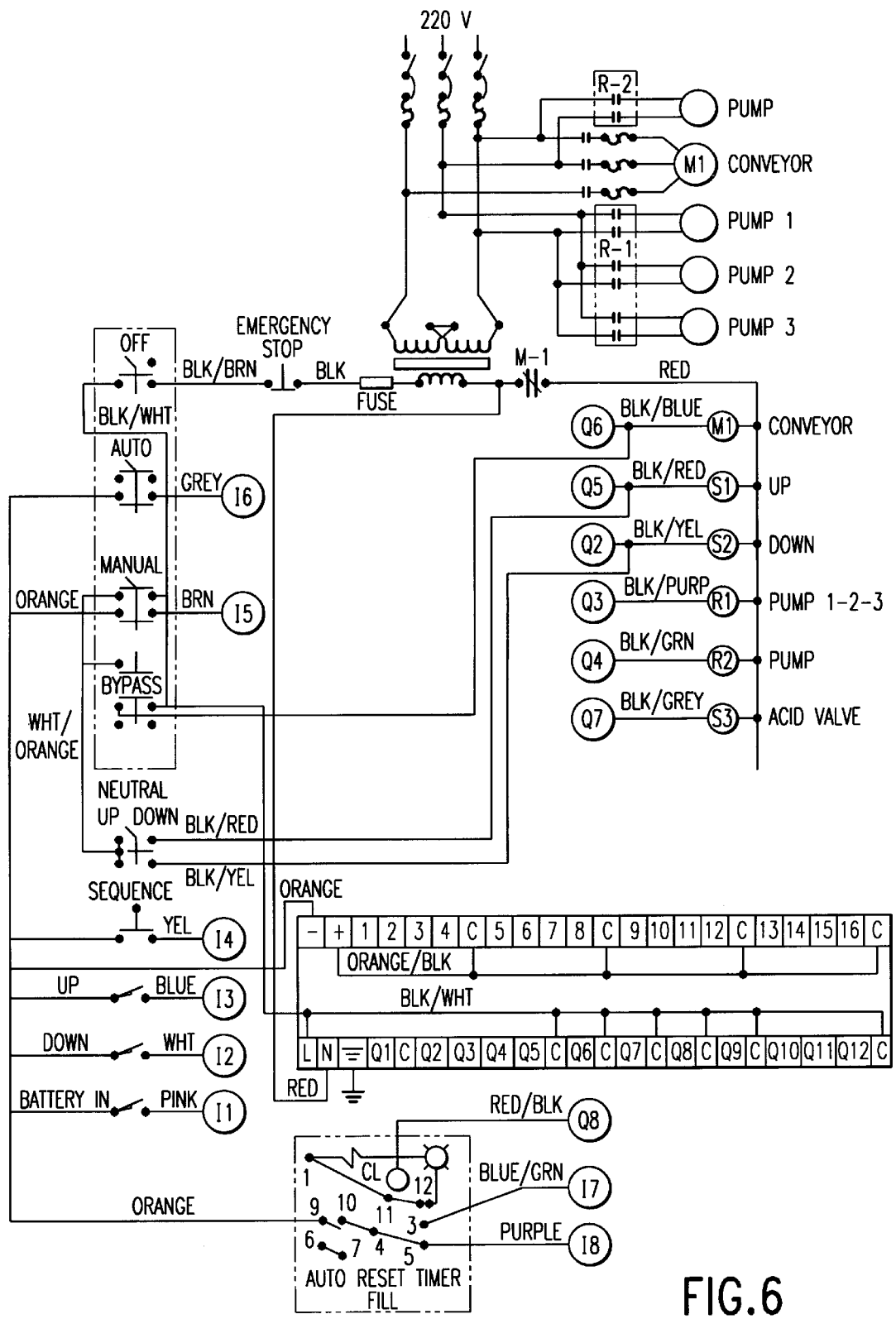
FIG. 6 is a schematic.

FIG. 6 shows the preferred electrical schematic.

There are also two selector switches 110, 112 and two push buttons 113, 115. The selector switch 110 is a four position switch: "off"; "automatic"; "manual"; and "by-pass". For the two position selector switch 112 to operate as well as the sequence push button 113, it is necessary for the selector switch 110 to be in the manual mode. The last push button is the emergency stop button. By pushing the sequence push button 113 all filling steps may be sequenced one at a time.

In operation, there are most preferably six fill level pumps which will be initiated first. Then the supply pump would be initiated. This condition will remain until the first battery comes into position. The filler head then lowers the six individual fill spouts into the battery vents, whereupon the six fill level pumps are shut off. The head in the acid supply line forces the acid into the battery cell. The slight clearance between the fill/vent hole and the spout, allows the air to escape out of the cell as the acid comes in. This will go on for a specific time interval, whereupon the fill level pumps will be initiated; thereby taking the level back down to the correct level and preventing the nozzles from dripping.

What is claimed is:

1. A battery acid filler apparatus comprising:

a supply pump means for supplying acid under a first head to a battery; said battery having a plurality of filler ports;

connecting tube means comprising a plurality of connecting tubes each connected at one end with said supply pump means and in fluid flow communication therewith for receiving acid therefrom;

a level pump means comprising a plurality of level pumps in fluid flow communication from each of their discharge ends to the other ends of each tube; said level pump means being capable of producing a second head higher than said first head from said supply pump means;

filler head means comprising a plurality of filler head tubes each connected to the other end of a different level pump of said plurality of level pumps and in fluid flow communication therewith; each of these filler head tubes terminates in a filler spout at the end remote from the end connected to the level pump; each of said filler spouts being dimensioned to fit inside a filler port;

sequencing means connected to said filler head means to move said filler spouts into said filler ports and thereafter to retract said spouts from said ports.

2. The apparatus of claim 1 wherein said sequencing means controls the flow of acid into said battery in accordance with a preset time interval.

3. The apparatus of claim 2 wherein the sequencing means controls the flow of acid into said battery such that the battery will be over filled to the point where the acid will rise into the filler port, but not over the top of the port.

4. The apparatus of claim 3 wherein once the time interval runs out, the sequencing means turns the level pump means "on" so that acid is extracted from the filler ports down to the terminal ends of the filler spouts.

5. The apparatus of claim 4 wherein the filler spouts are dimensioned to provide a clearance between them and the filler ports to permit air to flow therebetween.

6. The apparatus of claim 2 wherein the sequencing means controls the supply pump means and the level pump means such that the level pumps are turned "on" before the supply pump means is turned "on".

7. The apparatus of claim 6 wherein the sequencing means controls the sequence such that once the filler spouts are inserted into the filler ports, the level pumps are turned "off" thereby permitting acid to flow into the battery.

8. The apparatus of claim 7 wherein the sequencing means controls the flow of acid into said battery such that the battery will be over filled to the point where the acid will rise into the filler port, but not over the top of the port and once a predetermined time interval runs out, the sequencing means turns the level pump means "on", so that acid is extracted from the filler ports down to the terminal ends of the filler spouts.

* * * * *